Patented Feb. 20, 1951

2,542,518

UNITED STATES PATENT OFFICE 2,542,518

DENTIFRICE

Chester J. Henschel, New York, N. Y.

No Drawing. Application February 27, 1947,
Serial No. 731,413

4 Claims. (Cl. 167—93)

The present invention is concerned with dentifrices, more particularly with powdered dentifrices.

As conducive to a clear understanding of the invention, it is noted that the lactic acid formed by the *Lactobacillus acidophilus* commonly in the human mouth, and hereinafter referred to as Lactobacillus, attacks the mineral of the teeth, and caries result. While urea is known to inhibit growth of Lactobacillus the presence of low concentrations of urea in a dentifrice is worse than useless for combating caries because it serves as a food to stimulate the growth of the Lactobacillus and therefore would promote attack upon the mineral structure of the tooth. While urea of higher concentration tends to inhibit the growth of the Lactobacillus, its action is not sufficiently intense adequately to protect the user from caries unless the concentration of urea is quite high, and such concentrations may cause serious irritation, and moreover the bitter taste in such concentrations renders the use thereof quite repulsive.

It is among the objects of the invention to provide a dentifrice which promptly and efficaciously inhibits the action of the Lactobacillus, and also has a sustained protective action to prevent the deleterious action of the bacillus for a period of hours following the use of the dentifrice and which dentifrice performs various other functions looked for in such commodity and has no toxic action and no objectionable taste.

I have discovered that the Lactobacillus may be effectively inhibited if ammonium ions be released in the mouth. According to the invention from one aspect, a non-toxic water soluble ionizing ammonium compound, preferably a salt, would answer the purpose by releasing the ammonium ion on the wet brush and in the mouth. Such ammonium ion appears to have a specific inhibitory action upon the Lactobacillus, which apparently is not due to alkalinity since aqueous solutions of sodium and potassium salts with a pH identical with that of the ammonium salt are substantially worthless and therefore not equivalent for the purpose.

It is preferred for the purposes of the present invention to use ammonium phosphate and preferably diammonium hydrogen phosphate, because that compound in addition to performing the function of releasing the ammonium ion in the mouth, performs an important further function by greatly depressing the solubility of the calcium phosphate molecule of the tooth surface by keeping it in or converting it to the least soluble form, which is $Ca_3(PO_4)_2$.

While water soluble ammonium salts including diammonium hydrogen phosphate, release ammonium ion in large amounts effectively to enter the food plaques in the interstices of the teeth and to inhibit the Lactobacillus, the effect of such ions does not endure and Lactobacillus may resume activity after the ammonium salt has been washed out, usually a short time after the use of the dentifrice.

According to the invention from another aspect there is used concurrently with the ammonium salt and particularly with the di-ammonium hydrogen phosphate referred to, a proportion of urea in amount sufficiently great to avoid stimulation of the Lactobacillus growth, but not so great as to be an irritant to the mouth.

By the use in the dentifrice of a soluble ammonium salt and particularly of di-ammonium hydrogen phosphate together with urea, the action upon the Lactobacillus is surprisingly effective. The ammonium salt constituent performs a prompt and quick inhibiting action upon the Lactobacillus and the urea ingredient follows with a slow and enduring protective action for hours after the ammonium salt has been washed out. The action of the urea in this connection is promoted, apparently by adsorption and absorption thereof in the food plaques, where it acts to prevent incipient action of the Lactobacillus long after the ammonium salt has performed its quick action of inhibiting the active Lactobacillus and has been washed out.

The further advantage of the dentifrice is noted, that so long as ammonium ions are present in the mouth from ionization of the ammonium phosphate or other salt, hydrolysis of the urea is materially slowed up, so that the action of the urea is inhibited as long as the ammonium phosphate does its work and the urea does not really commence to function until after the ammonium salt has been spent. Accordingly, the dentifrice performs its Lactobacillus inhibiting action more effectively and over a period much longer than if either of the components were used singly. The ammonium phosphate acts quickly, thoroughly and efficaciously and the urea follows with a milder but sustained action to prevent resumption of activity of the Lactobacillus.

While the urea is bitter to the taste and the ammonium phosphate is salty, the mixture of the two has a taste less objectionable than that of either ingredient and especially of the urea when used alone and the taste of that mixture, moreover, lends itself more readily to masking by flavoring matter, than does urea alone.

Of course the ammonium salt and particularly di-ammonium hydrogen phosphate with urea would be used in the dentifrice with a suitable abrasive, which may be powdered chalk or calcium carbonate but preferably includes a substantial proportion, if it is not entirely of calcium fluoride, which latter will replenish any minor losses from the apatite components of the tooth enamel.

While the substances above mentioned, i. e., ammonium phosphate or other ammonium salt, urea and an abrasive including calcium fluoride may be used without other ingredients, the dentifrice preferably includes also a suitable filler such as bentonite, a suitable penetrant or wetting agent such as sodium lauryl sulfoacetate and suitable flavoring matter including a sweetening agent to overcome the bitterness of the urea and the saltiness of the ammonium phosphate. The sweetening agent would preferably be saccharin, since sugar would objectionably promote the formation of the lactic acid that attacks the structure of the tooth.

While the dentifrice may be made in any of numerous forms, an illustrative dentifrice would be by weight within the following ranges of composition:

| | Parts |
|---|---|
| Di-ammonium hydrogen phosphate | 7 to 4 |
| Urea | 15 to 50 |
| Bentonite | 3 to 8 |
| Sodium lauryl sulfoacetate | 3 |
| Precipitated calcium carbonate and calcium fluoride | 71 to 34 |
| Saccharin | .3 |
| Methyl salicylate | .7 |

Preferably the urea is in proportion not less than 23 and not more than 46 parts.

A specific formula that has been found to be generally serviceable has the following components in the following proportions by weight:

| | Parts |
|---|---|
| Di-ammonium hydrogen phosphate | 5 |
| Urea | 23 |
| Bentonite | 5 |
| Sodium lauryl sulfoacetate | 3 |
| Precipitated calcium carbonate | 53 |
| Calcium fluoride | 10 |
| Saccharin | .3 |
| Methyl salicylate | .7 |

It will be understood that the dentifrice may be specially formulated within the scope of the foregoing teachings for adaptation by the consultant to the particular needs of the individual patient, but the specific formula last mentioned is in general suitable for use by the public without prescription and is quite efficacious for the normal human mouth.

While the dentifrice is preferably put up in powdered form, it is within the range of the invention to incorporate such active ingredients in a paste or liquid form.

As many changes could be made in the above composition and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A powdered dentifrice including the following ingredients in substantially the following proportions by weight:

| | Parts |
|---|---|
| Urea | 15 to 50 |
| Di-ammonium hydrogen phosphate | 7 to 4 |
| Abrasive | 71 to 34 |

2. A powdered dentifrice consisting of the following ingredients in substantially the following proportions by weight:

| | Parts |
|---|---|
| Urea | 15 to 50 |
| Di-ammonium hydrogen phosphate | 7 to 4 |
| Abrasive | 71 to 34 |
| Sodium lauryl sulfoacetate | 3 |
| Saccharin | .3 |
| Methyl salicylate | .7 |

3. A dentifrice having as active ingredients, urea and diammonium hydrogen phosphate, the urea being by weight between 15 and 50 per cent by weight of the dentifrice and the diammonium hydrogen phosphate being between 4 and 7 per cent by weight of the dentifrice.

4. A powdered dentifrice of the type that comprises abrasive, flavoring and penetrant or wetting agent, said dentifrice having as active ingredients both urea and diammonium hydrogen phosphate, the urea being approximately 23 per cent by weight and diammonium hydrogen phosphate being approximately 5 per cent by weight of the dentifrice.

CHESTER J. HENSCHEL.

REFERENCES CITED

The following references are of record in the file of this patent:

UNITED STATES PATENTS

| Number | Name | Date |
|---|---|---|
| 1,377,780 | Lane | May 10, 1921 |
| 1,526,940 | Staegemann | Feb. 17, 1925 |
| 1,717,723 | McCall | June 18, 1929 |
| 1,943,856 | Cross | Jan. 16, 1934 |
| 1,969,340 | Vogt | Aug. 7, 1934 |

FOREIGN PATENTS

| Number | Country | Date |
|---|---|---|
| 291,565 | Germany | Apr. 22, 1916 |
| 765,453 | France | Mar. 26, 1934 |
| 803,161 | France | June 29, 1936 |

OTHER REFERENCES

The New York Journal of Dentistry, January 1950, pages 3–5.

The Mfg. Chemist and Mfg. Perfumer, November 1949, pages 527, 528.

Drug and Cosmetic Industry, pages 147, 231 and 232, "Status of Ammoniated Dentifrices," February 1950.

Jour. Amer. Pharm. Assn. (Prac. Pharm. ed.), April 1950, page 240.

Drug and Cosmetic Industry, September 1949, page 264.

Drug and Cosmetic Industry, June 1949, page 677.

Drug and Cosmetic Industry, May 1949, page 544.

The Amer. Perfumer, sec. I, July 1949, pages 29 and 31.

The Washington Post, May 11, 1949.

Amer. Jour. of Orthodontics and Oral Surgery, vol. 33, No. 2, pages 80–101, October 1946 (Kesel et al.).

Science News Letter (Kesel et al.), February 23, 1946, page 117).

Mfg. Chemist and Perfumer, June 1942, page 140.

Grove, "The Biochemical Aspect of Dental Caries," The Dental Cosmos, October 1943, pages 1029–1036.

Stephan et al., "Effectiveness of Urea and of Synthetic Detergents in Reducing Activity of Human Dental Caries," Proc. Soc. Exp. Biol. and Med., February 1944, pages 101–104.